Figure 2:
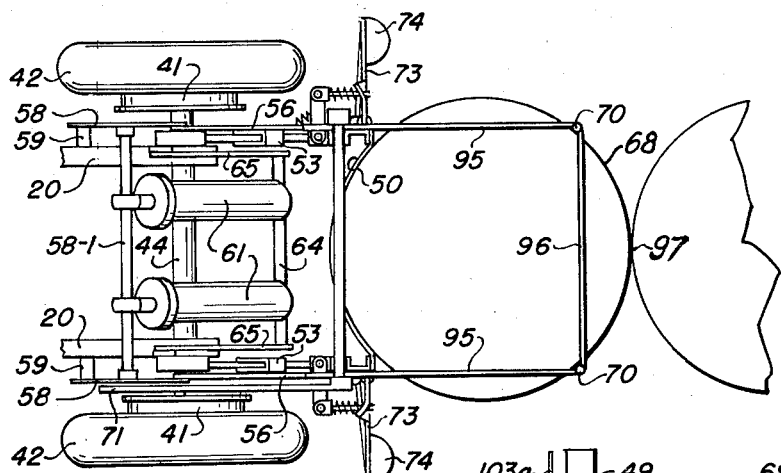

July 19, 1955  J. R. GARDNER ET AL  2,713,433
INDUSTRIAL TRUCK
Filed Dec. 4, 1948  4 Sheets-Sheet 1

Inventors:
JOHN R. GARDNER
WILLIAM F. MILLER
Attorneys.

July 19, 1955  J. R. GARDNER ET AL  2,713,433
INDUSTRIAL TRUCK

Filed Dec. 4, 1948  4 Sheets-Sheet 2

Inventors:
JOHN R. GARDNER
WILLIAM F. MILLER

Attorneys.

July 19, 1955 — J. R. GARDNER ET AL — 2,713,433
INDUSTRIAL TRUCK
Filed Dec. 4, 1948 — 4 Sheets-Sheet 3

Inventors:
JOHN R. GARDNER
WILLIAM F. MILLER
Attorneys.

July 19, 1955 J. R. GARDNER ET AL 2,713,433
INDUSTRIAL TRUCK
Filed Dec. 4, 1948 4 Sheets-Sheet 4

Inventors:
JOHN R. GARDNER
WILLIAM F. MILLER
By
Attorneys.

United States Patent Office 2,713,433
Patented July 19, 1955

2,713,433
INDUSTRIAL TRUCK

John R. Gardner, North Pekin, Ill., and William F. Miller, Grantsville, Utah

Application December 4, 1948, Serial No. 63,464

15 Claims. (Cl. 214—653)

This invention relates to industrial or utility trucks of the type arranged to pick up, carry, and deposit loads.

Special problems exist in the handling of extremely heavy and bulky items, notably rolls of newsprint as shipped from paper mills for ultimate delivery to newspaper printing plants. Newsprint rolls are customarily handled manually by means of so-called hand-trucks in moving them into and out of freight cars, warehouses, etc., prior to actual consumption by the newspaper publishing industry. Inasmuch as the average roll weighs approximately 2,000 pounds, or one ton, this manual handling is exceeding arduous work. The problem of initially tilting the roll from its usual endwise standing position so the supporting lip of a hand-truck may be inserted thereunder is, alone, a challenging one. Heretofore there has been no industrial truck capable of satisfactorily undertaking and handling this work.

A primary object of the present invention, therefore, is to provide a power-operated industrial truck capable of quickly and easily picking up, carrying, and depositing such heavy and bulky items as rolls of newsprint.

Among other objects of the invention are:

To provide an industrial truck of this type which, in itself, may be of comparatively lightweight construction, considerably lighter in weight than the load it handles.

To provide a construction which operates with facility in small spaces, such as the interiors of freight cars and haulage trucks.

To provide for a powered, initial tipping of the item, and for the insertion thereunder, automatically, during such tipping, of load-engaging and supporting members.

To provide for the automatic disengagement of the load by such members just prior to the depositing of the load.

To provide for such automatic load engagement and disengagement in other than power-operated trucks, where found desirable.

To provide for ready and convenient grasping of the top of a newsprint roll, even though a number of such rolls are standing endwise in circumferential contact with one another.

To provide for the handling of rolls of newsprint without damage thereto.

To provide for the easing of a roll of newsprint onto lifting members, and for securely elevating the roll into a firmly maintained riding position.

To provide a construction whereby the truck may commence its travel as soon as the load leaves the ground, regardless of whether or not such load is in its final riding position.

To provide for simple and handy control of all mechanism.

An important structural feature of the invention in the attainment of the foregoing objects is the provision of a load-receiving carriage arranged for substantially unlimited manipulation within a vertical plane, so as to be able to stand up to the load in the grasping stage, give an initial tilt to the load following the grasping thereof, and thereafter lift the load upwardly and backwardly to a well-balanced riding position which is favorably disposed relative to the chassis and road wheels of the truck, and, conversely, so as to be able to deposit the load in reverse manner.

The carriage advantageously has a two point suspension mounting on the truck proper, the mounting embodying linkage having at least four unsymmetrically arranged pivotal connections, two of which are stationary fulcrum points and the remainder floating. In this way facile manipulation of the load is made possible for the purposes of the invention.

An outstanding feature resides in the provision of means whereby the initial tilting of the carriage automatically causes load-engaging and supporting members to swing in laterally under the bottom of the load to insure retention of the load on the carriage during the continued lifting and moving thereof to riding position and thereafter during riding and final discharge of the load, such means also acting to automatically cause the load-engaging and supporting members to swing outwardly out of engagement with the load as it is being discharged from the truck following transportation.

Distinctive features reside in the leverage system whereby loading and unloading, as well as carrying of the load, are effected. This system is designed to achieve a certain balance between the weight of the load and the weight of the truck itself, with the ultimate object of bringing the center of gravity of the combined weight sufficiently back of the point at which the driving wheels rest on the ground that the load will not overbalance the machine. The system forms a connecting linkage between the load carriage and the truck proper, and moves the center of gravity of the load toward the truck proper while the load is being raised from the ground, thereby avoiding the tendency of the truck to be up-ended. At the same time, this leverage system makes it possible to dispose the relative weights of the load and the truck so that in comparison with industrial trucks as heretofore constructed, the relative weight of the truck is brought to such a minimum that frequently the load outweighs the truck.

In the lifting position, the lower portion of the load is raised above the ground sufficiently to provide running clearance, while at the same time the upper portion is pulled back to a point where the center of gravity of the combined weights of truck and load is back of a vertical plane passing through the front axle. Immediately the load is tipped off the ground, the transportative gear can be thrown into action, and the truck be fully under way before the load reaches the final carrying or riding position. This effects a worthwhile saving in time, and contributes largely to the working efficiency of the machine.

Additional objects and features of the invention will become apparent as the description proceeds in detail.

Figure 1:
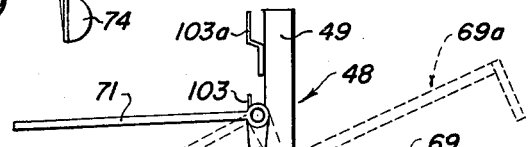
Figure 1:
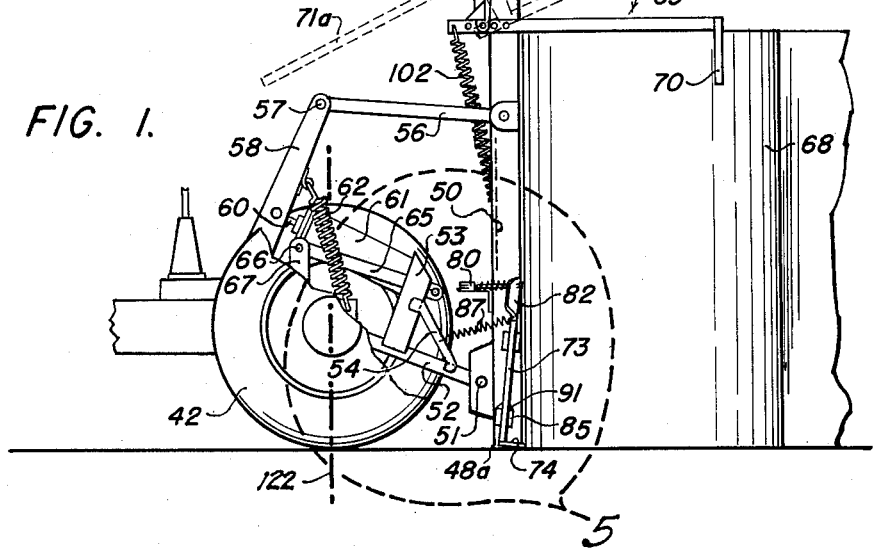
Figure 3:
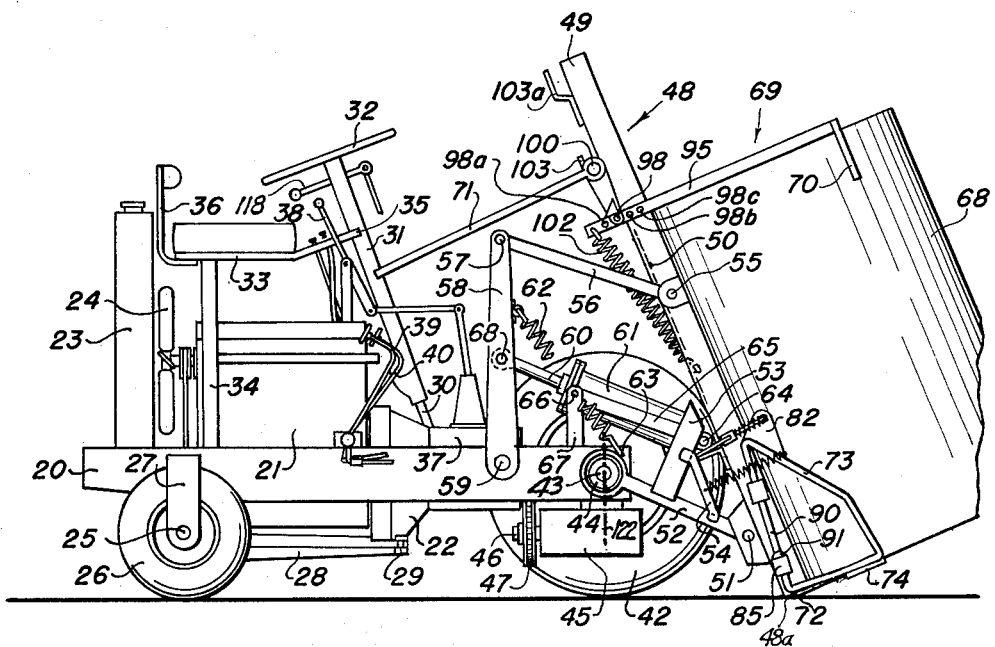
Figure 4:
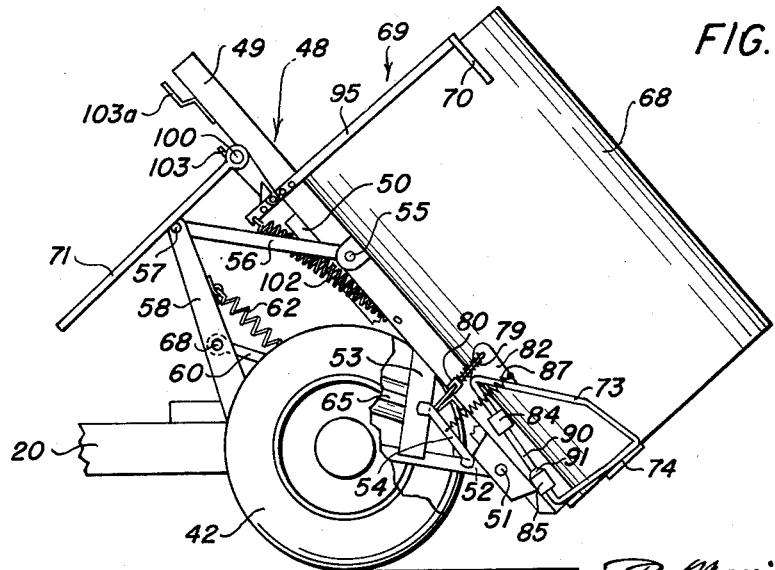
Figure 7:
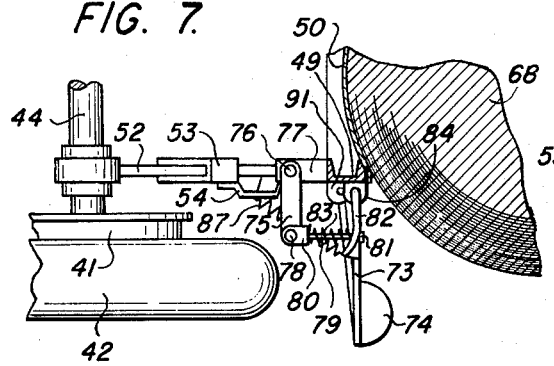
Figure 8:
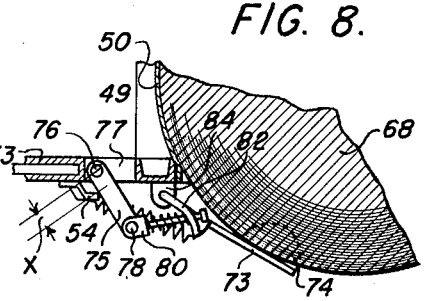
Figure 5:
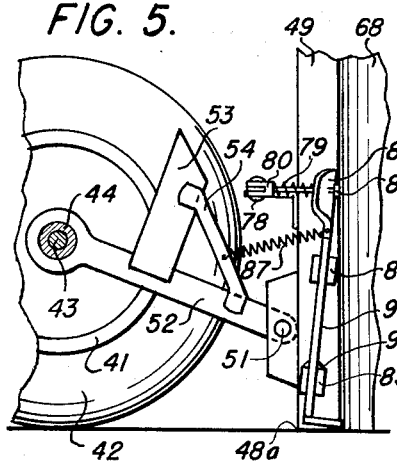
Figure 6:
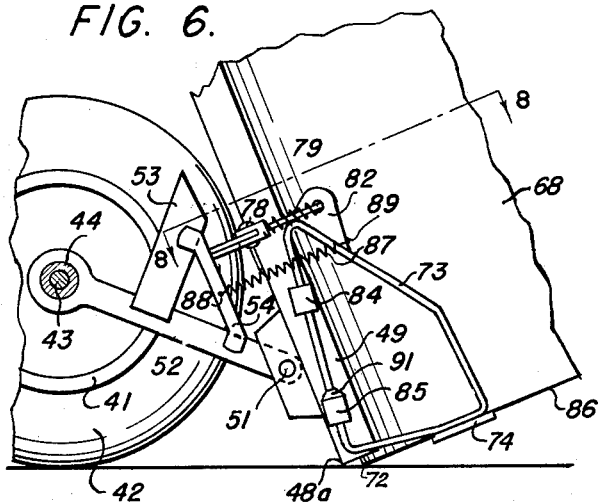
Figure 9:
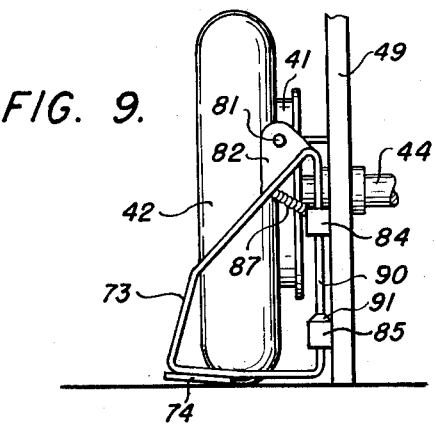
Figure 11:
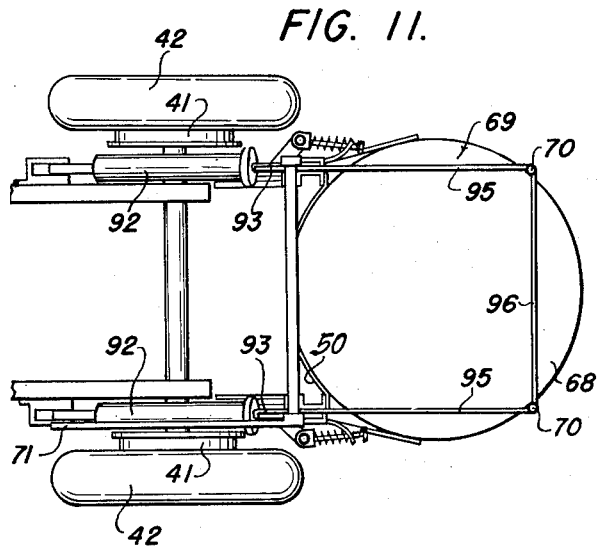
Figure 12:
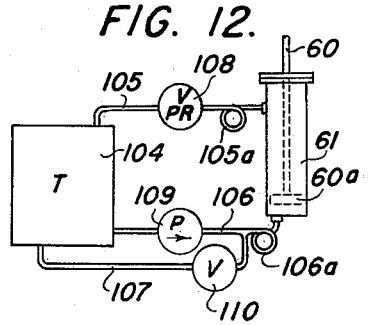
Figure 13:
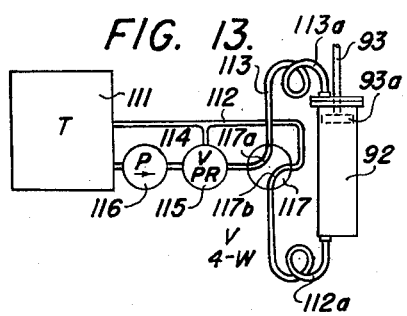
Figure 10:
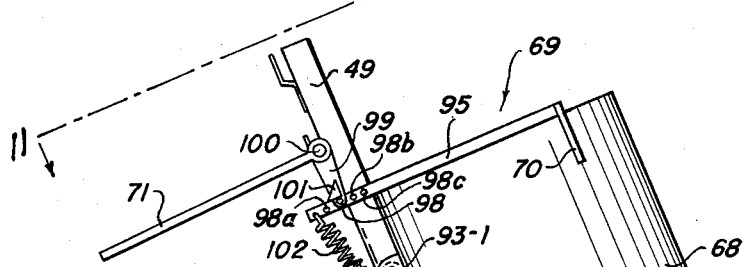
Figure 10:
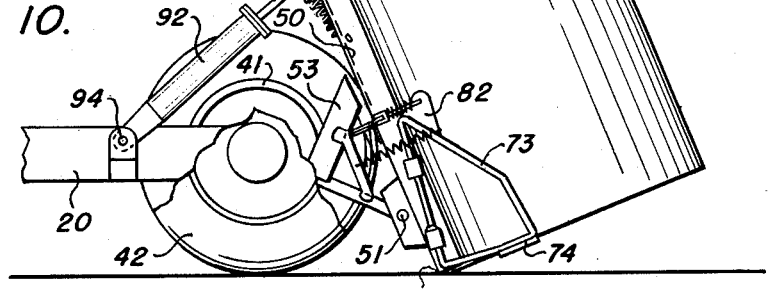

In the accompanying drawings which illustrate presently preferred embodiments of the invention:

Fig. 1 represents a fragmentary side elevation, showing the front portion of the machine ready to engage a load;

Fig. 2, a plan, corresponding to Fig. 1;

Fig. 3, a side elevation of substantially the complete machine in a load-engaging position which is assumed immediately prior to load-lifting, the near front wheel being omitted;

Fig. 4, a view corresponding to that of Fig. 1, but illustrating the load-carrying position;

Fig. 5, an enlargement of substantially that portion enclosed by the broken line 5 in Fig. 1;

Fig. 6, a view similar to Fig. 5, but showing the parts as they appear in the load-engaging position of Fig. 3;

Fig. 7, a plan corresponding to Fig. 5;

Fig. 8, a plan looking from the line 8—8 in Fig. 6;

Fig. 9, a fragmentary front elevation corresponding to Fig. 5;

Fig. 10, a fragmentary portion of an alternative construction, the view corresponding in general to that of Fig. 3;

Fig. 11, a plan taken from the point of view of line 11—11, Fig. 10;

Figs. 12 and 13, diagrams showing, respectively, the manner of applying motive power to lifting mechanism by means of single-acting hydraulic cylinders, and double-acting hydraulic cylinders.

Referring to the drawings: the numeral 20 denotes a frame or chassis on which is mounted an automotive engine 21, including a usual flywheel housing 22, a radiator 23, a fan 24, a steering-knuckle axle 25, together with such other appurtenances that are necessary to complete the automotive power plant in a manner well-known to automotive engineers. The steering-knuckle axle 25 is connected to the frame 20 in the usual manner, but, in the present instance, is located at the rear of the truck and has mounted thereon the carrying wheels 26.

The frame or chassis 20 is suspended on the steering-knuckle axle 25, for illustration, by means of hangers 27, the hangers being braced forwardly by the reach member 28 which connects through a steering link 29 with a steering rod 30, the latter being operatively disposed in a steering post 31 in a manner that is well-known. At 32 is a steering wheel conveniently accessible from the driver's seat 33, the latter being supported on standards 34. A front extension 35 forms a dash, while a rear extension carries a back rest 36. A power transmission 37 extends forwardly of the engine 21 and is controlled by an operating lever 38 in a well-known manner. Right and left brake pedals are indicated respectively at 39 and 40, it being understood that usual connections, not shown, extend to brake bands encircling brake drums 41, the latter being mounted on respective driving wheels 42.

In the present instance the driving wheels 42 are in front, and are mounted on respective differential axle portions 43, the latter being encased in a housing 44. At 45 is a usual differential gearing having a shaft 46 which receives power from the transmission 37 by means of a chain drive 47.

What has so far been described relates largely to the transportative mechanism per se, which may be considered a separate, though inter-related, mechanism from the loading and carrying mechanism now to be described.

*Loading and carrying mechanism*

This mechanism comprises a carriage assembly 48 consisting of sidebars 49 between which is supported a cradle 50. The lower portions of the sidebars 49 are pivotally connected at 51 to the free extremities of respective rocker arms 52, which are hereinafter considered as being parts of a rock arm assembly. The rocker arms 52 are fulcrumed on the axle housing 44, so as to cause the free extremities of the rocker arms to direct certain travel motions of the carriage 48, while the respective fulcrums at 44 are stationary relatively to the frame 20. At 53 are stops or bumpers advantageously braced at 54 to the respective rocker arms 52, both the stops 53 and braces 54 forming fixed or integral parts of the rocker arm assembly.

At points that may be considered as being located at upper intermediate portions of the sidebars 49, and therefore of the carriage, are pivotal connections 55 that hold respective links 56, the latter in turn being pivotally connected at respective points 57 to respective operating levers 58 which make up what is hereafter spoken of as an operating leverage. These levers are fulcrumed at respective points 59 on opposite sides of the frame 20, and are powered to oscillate, in this instance, by means of respective piston rods 60, pivotally connected thereto by means of a transverse pivot bar 58-1, Fig. 2. The piston rods work in respective cylinders 61, which, in this embodiment, are of the single-acting hydraulic type. Power is applied to move the piston rods 60 outwardly, so as to be operative to move the carriage assembly from a standing position, indicated in Fig. 1, through the load-engaging position in Fig. 3, to the load-carrying position of Fig. 4. Since the power mechanism is single-acting, there are added respective tension springs 62, which extend from the leverage 58 to suitable points, for example 63, on the frame 20. Such springs are operative to assist the descent of the carriage assembly, being additive to the gravitational force that is asserted because of the weight of the carriage structure alone or with load. The cylinders 61 are oscillatingly mounted on transverse rod 64, which is secured to and extends between arms 65. The arms 65, in turn, are fulcrumed on stationary pivots 66 supported in standards 67, the latter being fixed on the frame 20. The purpose of this floating cylinder mounting will appear hereinafter.

*Manner of placing and holding load on the carriage*

The load considered in the present instance, is a roll 68 of newsprint paper. Such rolls, as they are received from the mills, vary from approximately 36 to 41 inches in diameter and are frequently up to 72 inches in length, the weight of a roll often being as much as 2000 pounds. The rolls are shipped standing on end, and the automatic mechanical picking up of a roll presents a problem. In the present instance, this is accomplished by bringing the carriage into substantially the vertical position against the standing roll 68, as in Fig. 1, and securing the upper end of the roll by means of a bail 69 having depending fingers 70. The bail is brought down from the retracted dotted position 69a by means of a handle 71, which at the same time is operative to draw the roll into contact with the cradle 50 of carriage 48. Thereupon, power is applied to the pistons in cylinders 61, whereby the carriage, accompanied by roll 68, is rocked backwardly on lower edge portions thereof. This occurs just previous to the inclination illustrated at 72 in Fig. 3. During this tilting movement of the carriage and roll, wings 73, having feet 74, are snapped from the positions of Figs. 1 and 2, into the respective engaging positions of Fig. 3. In the latter positions, the wings 73 lie close to the cylindrical surface of the roll while the feet 74 are beneath the basal end surface of roll 68, as shown in Fig. 8.

Continuing the application of power, the carriage assembly 48, with its load, is raised to the position of Fig. 4 after the sidebars 49 have contacted the bumpers or stops 53. Further application of power raises both the carriage assembly and the rocker arm assembly to a final high point (not illustrated) determined by the limit of the power stroke of piston rod 60, as hereinafter explained in detail. In the final position of the present compact construction, the cradle and its load bear down upon the near ends of cylinders 61, the flexible mounting of which, by means of arms 65 and appurtenances hereinbefore referred to, allow the cylinders to be depressed accordingly.

Reverting now to the means employed to actuate the swinging wings 73, reference is made particularly to Figs. 1, 2 and 5 to 9. Starting with the normal or retracted position of the wings, as illustrated in Figs. 1, 2, 5, 7 and 9, the initial tilting or rocking of the carriage 48 takes place about its rearward lower edge 48a. As the backward tilting movement continues, arms 75, pivoted at respective points 76, Fig. 7, on respective brackets 77, which latter are fixed on side bars 49, presently will contact respective abutment members or braces 54. Continued backward travel causes braces 54 to snap arms 75 forwardly, for illustration, from the position in Fig. 7 to that in Fig. 8. The snapping action is caused by the relative shortness of the respective lever arms, see X, Fig. 8, formed adjacent the respective fulcrum pivots 76.

At each side of the machine, as part of the wing assemblies, there is pivoted, at 78, to the free end of arm 75, a stem 79 having the forked end 80 and the head 81. The stem extends through a lug 82 that is integral with wing 73. Tensioned between fork 80 and lug 82 is a compression spring 83 that exerts its force to hold the lug yieldingly against head 81. The wings 73 are hinged in lugs 84 and 85 that are fast on the respective sidebars 49. It will be observed that the hinge axis slopes downwardly and backwardly with respect to the sidebar 49, as particularly shown in Figs. 5 and 6. This is for the purpose of causing the feet 74 to be low enough to clear the basal surface 86 of the roll just before further upward travel of the carriage lifts the feet to the level of engagement with surface 86. The yielding bearing of lugs 82 against springs 83 provides for different diameters of rolls, thus allowing the stem 79 to idle forwardly through the lug, while, at the same time, spring 83 maintains the contact between wings 73 and the roll.

When unloading a roll, as will be subsequently described in greater detail herein, it becomes necessary to return the wings 73 to their initial positions. This is effected by means of tension springs 87, which, respectively, have one end fastened at 88 to the corresponding brace 54 and the other end fastened at 89 to the corresponding wing 73. Thus, the retractive force of springs 87 comes into play to return the respective wings to their initial positions as soon as the carriage reaches the point where the respective arms 75 clear the respective braces 54.

In order that wings 73 shall support roll 68 it is necessary that a positive bearing be provided between the hinge bar 90 and one or both of the lugs 84 and 85. In this instance, an upset collar 91 integral with hinge bar 90 rests on lug 85 and constitutes the positive bearing.

In Figs. 10 and 11 is illustrated another construction showing double-acting cylinders 92 as the power means for moving the load carriage. From these cylinders, piston rods 93 extend directly to the carriage 48, and are pivotally connected to the respective sidebars 49 thereof, as at 93–1. The cylinders themselves are oscillatingly connected to the frame 20 at 94. A connection of this type effects a considerable saving in constructional labor and material and, obviously, is also applicable in the case of single-acting cylinders.

The double-acting feature of the embodiment of Figs. 10 and 11 provides for positive and fast lowering of the load to the discharge position, the cylinders 92 and piston rods 93 themselves performing the functions of the links 56 and leverage 58 of the prior embodiment. In the case of the single-acting construction of the prior embodiment, however, the lowering of the load is comparatively slow, especially in cold weather when liquid in the system congeals.

In other respects, the structure and operation of the carriage and its appurtenances in this double-acting construction are the same as already described with respect to the first embodiment.

*Top engagement of the load*

The bail 69 in both cases consists preferably of a rectangular frame formed of light metallic side members 95 and a front member 96. At the corner intersections of members 95 with member 96 are fixed fingers 70. The finger construction is desirable in order that the roll may be engaged at points other than the middle tangent point 97, Fig. 2. It so happens that when a plurality of rolls stand close together, a tangential point of contact between them usually lies in the longitudinal center plane of the machine. The close contact between standing rolls makes it difficult to drop a usual hoop or band around the roll without first separating the contacting rolls. This difficulty is completely eliminated by means of the spaced fingers.

In practice, to properly handle rolls of different diameters, it is necessary to provide an adjustment so the fingers 70 shall properly contact the roll to draw it against the carriage. For this purpose holes 98a, 98b, and so on, are provided in the bail, whereby the pivotal point of suspension 98, from the depending arms 99, is varied accordingly. The arms 99 as well as handle 71, previously mentioned herein, are rigidly mounted on a shaft 100. In order to lift the bail 69, handle 71 is depressed, while wedge heels 101, fixed on the arm 99, hold the bail in position as it is being lifted. At the same time, the bail, after being lowered onto a roll, allows handle 71 to be raised for tightening the depending fingers against the roll, without disturbing the resting position of the bail. As a matter of convenience in the present instance, a spring 102 acts to counterbalance the bail 69 to the necessary extent. The shaft 100 has different positions up and down along the sidebars 49 of the carriage 48 in order to accommodate rolls of different heights. For this purpose, open brackets 103 and 103a are provided as shown in Fig. 3, the shaft 100 with its fixtures being easily dropped into different brackets as may be required.

*Hydraulic prime moving mechanisms*

In the hingle-acting hydraulic mechanism shown in diagram in Fig. 12, cylinder 61 is in communication with the liquid supply tank 104 through conduits 105, 106 and 107. Conduit 105 has a pressure relief valve 108 and a flexible conduit portion 105a. Conduit 106 has a pressure pump 109 and a flexible conduit portion 106a, while conduit 107 has a shutoff valve 110. In operation, assuming that piston 60a is at the beginning of the power stroke ready for action, action is started by closing valve 110 thereby causing pump 109 to force the piston forward on its power stroke. This continues until the piston passes the opening of conduit 105a, thereby stopping the forward motion of the piston and allowing the pressure stream from the pump to idle through pressure relief valve 108 and conduit 105 back into the tank. As long as valve 110 stays closed, the carriage and its load are held in the elevated riding position. As soon as the load is to be lowered, the operator opens valve 110 which causes the carriage and its load to descend by gravity and force the oil that is ahead of the piston, through conduit 107 back into the tank. At the same time, the pump 109 exerts its pressure merely to idle the liquid current through conduit 107 back into the tank.

In Fig. 13, the double-acting cylinder 92 is in communication with supply tank 111 by means of conduits 112 and 113. Conduit 112 has a branch 114 extending into a pressure relief valve 115, also a flexible connection 112a extending into one end of the cylinder 92. Conduit 113 includes a pressure relief valve 115 and a pressure pump 116, also a flexible connection 113a which extends into the end of the cylinder 92. Between the conduits 112 and 113 is a 4-way valve 117 having ports 117a and 117b. In operation, assuming that the piston 93a is at the beginning of a lifting stroke and the 4-way valve to be set as illustrated in Fig. 13, where the pump 116 is forcing liquid under pressure through the pressure relief valve 115 and through conduit 113 into cylinder 92, motion is imparted to the carriage mechanism up to a point where it is held in its riding position. In order to lower the carriage and load, the 4-way valve 117 is moved through 90°, so that the port 117a will connect the pressure relief valve 115 with the conduit portion 112a, while, at the same time, port 117b will connect conduit 112 with conduit portion 113a. The pump will then force liquid through conduit 112a into the cylinder 92 and move the piston 93 back to the position 93a. Liquid that is forced out of the cylinder ahead of the piston flows through conduit 113a, through 4-way valve 117, and back into the tank 111. At the same time, the liquid which is forced through the pressure relief valve, finds its way through branch 114 back into the tank.

In the arrangement of Fig. 12, the valve 110 is controlled by any suitable means, such as a lever 118 on steering post 31, Fig. 3, and well known connections (not shown) between the lever and the valve. This applies also in the case of 4-way valve 117 of Fig. 13.

Maneuverability of truck

The steering mechanism described hereinbefore with respect to the truck proper is effective on the rear carrying wheels 26. Maneuverability is, however, considerably increased by providing independent braking action for the two forwardly disposed drive wheels 42.

For this purpose, the two brake pedals 39 and 40 are rigged up to independently actuate respective brakes 119 which are operative upon the drive wheels 42. For convenience of control, the left-hand pedal 39 is connected with the brake of the left-hand drive wheel, while the right-hand pedal 40 is connected with the brake of the right-hand drive wheel.

The driver need only press the appropriate brake pedal in order to swing the entire truck sharply around, either to the left or to the right, meanwhile turning the steering wheel 32 in the proper directions to consummate the desired turn.

Recapitulation

The load carriage 48 with its appurtenances may be considered a primary assemblage, while the rocker arms 52 with the accompanying appurtenances may be considered a secondary assemblage floatingly fulcrumed to the primary assemblage and supported by the truck proper. The operative travel relationship between the primary and secondary assemblages is made use of to impart motion to the intervening actuating mechanism, whereby the wings 73 are automatically swung into place to receive and support the load as it comes into place on the carriage, and again to retract the wings when the load is to be discharged from the carriage.

The stationary fulcrums together with the floating fulcrums form variable quadrilaterals, as shown by dot-dash lines 120 and 121 in the elevations of Figs. 3 and 10, respectively, in which the four sides remain constant but in which the four angles are constantly changing during the travel of the primary assemblage. At no time is the quadrilateral in any sense a parallelogram, for the reason that the floating suspension points of the assemblage are required to follow mutually differentiated paths of travel, as hereinbefore set forth.

It should be noted that the automatic operation of the wings 73 in swinging toward the tipped load, laterally thereof, so the feet 74 are brought to a supporting position within the resulting open space under the load, easily and without damaging the latter, is attributable to the fact that the pivoted arms 75 of the primary assemblage engage the respective braces as contact stops, and are actuated thereby, as the load is brought to the initial inclined or tilted position of Figs. 3 or 10. From this position, the load may be lifted with perfect security to the ultimate carrying or riding position.

When, through the operation of the hydraulic power mechanism, the carriage and load are moved from the original starting position to the final carrying or riding position, the movement consists of two distinct stages. The first stage consists of the carriage, together with its load, tilting backwardly while turning around the pivot 51 unit until the frame member 49 comes into contact with the stop 53. During this entire first stage the load remains in contact with the floor or other supporting surface at 72. Also, during the later part of the first stage, the wings 73 are automatically swung into place so as to be in position to support and raise the load during the lifting action of the second stage. The position shown in Fig. 3 is that assumed at approximately the completion of the first stage. During the second stage, the carriage, load, and rocker arm assembly move as a unit, turning around pivot point 44. The load is moved upwardly and backwardly over the front axle. The position shown in Fig. 4 is that assumed at approximately the completion of the second stage of the ascending cycle. The complete motion through both stages is uninterrupted.

As can be seen from the drawings, the load is positioned over the front or drive axle 43 for support by the driving wheels 42 even in its initially inclined or tilted position. Just before the second operative stage commences, the center of gravity of the load and machine combined is located behind a vertical plane, see 122, Fig. 3, that passes through the rotative axis of the front axle 43. As the load is lifted from this initial position, it is simultaneously shifted rearwardly due to the unique operative characteristics of the leverage connection between the primary and secondary assemblages. Thus, the load is so manipulated that its center of gravity is kept low and at successive locations disposed rearwardly of the front or drive axle 43 during the critical lifting and carrying stages of the operation of the truck, as well as during similar stages of load discharge. Thus means that the truck itself may be lighter than the load, and may be of compact construction with a short wheel base making for convenient maneuverability.

The maneuverability is further enhanced by the provision for independent braking of the driving wheels 42, whereby turning of the truck may be achieved within a remarkably small space. This maneuverability adapts the truck for use in practically all phases of handling of a roll of newsprint, whether within the narrow confines of a freight car or similar transporting carrier, or within a congested warehouse or printing establishment.

The truck of the invention is adapted to deposit the load either on end or on its side. For the end deposit, the load carriage is brought to the standing position of Fig. 1 from the previously-assumed, inclined position of Fig. 3. Since the wings 73 with their supporting feet 74 have meanwhile been retracted, the driver need only manipulate the handle 71 to disengage the bail 69 from the top of the load, and then back away from the completely released and standing load. For the side deposit, the load is brought to the inclined position of Fig. 3, where a rearward portion of the bottom circumference of the roll rests on whatever surface is to receive it, and where, after the wings 73 and supporting feet 74 have been retracted, the truck is backed away from the load, enabling the latter to slide gently down the inclined surface of the cradle 50 until it rests lengthwise upon the receiving surface.

With respect to the automatically operative load-engaging and supporting means which come into play upon the initial tipping of the load, the same being here shown as laterally-disposed wing assemblies, these form a sub-combination of the larger inventive combination which includes the load-manipulating means. As such, they may be utilized, if desired, in connection with an ordinary hand truck where the load is initially tipped by hand and transported manually, the tipping of a load carriage which corresponds to that here illustrated, serving to actuate the wing assemblies in the manner hereinbefore set forth.

Either of the pumps, 108 of Fig. 12, or 116 of Fig. 13, is advantageously driven from the engine 21 in any well known manner. The important consideration is, that preferably either pump should be connected to run constantly, so that the load can be lifting, while at the same time, the truck is transporting it.

The present application constitutes a continuation-in-part of our copending allowed application, Serial Number 629,248, filed November 17, 1945, entitled "Industrial Truck," which application is now abandoned.

Whereas this invention is here illustrated and described in detail with respect to certain presently preferred embodiments thereof, it should be understood that various changes may be made therein and various other embodiments may be constructed, on the basis of the teachings hereof, by those skilled in the art, without departing from the scope of the following claims.

We claim:

1. In a utility truck, the combination of a load carriage having a standing position and a riding position; a wheeled vehicle arranged to support the carriage in a riding position; a lever system operative to move the carriage from standing position to riding position and vice versa, said system including a leverage fulcrumed on the vehicle and having its free end pivotally connected to a lower portion of the carriage; another leverage fulcrumed on the vehicle in spaced relation to the fulcrum of the first leverage and having its free end connected to an upper portion of the carriage; extendable and retractable hydraulic mechanism connected to and between the second leverage and said vehicle, so the respective lower and upper portions of the carriage are moved relative to the respective fulcrums; and a stop disposed on the first-mentioned leverage, whereby motion of the carriage relative to the pivotal connection at the free end of the first-mentioned leverage in the ascending cycle of the carriage, ends, upon initial extension of said hydraulic mechanism, while further extension of said actuating mechanism becomes effective to revolve the entire carriage about the fulcrum of the first-mentioned leverage as a center.

2. The combination with a utility truck, of loading and carrying mechanism comprising a carriage assembly; a rocker arm assembly having a fixed pivot axis on said truck and having a floating pivot, said carriage assembly being fulcrumed on said floating pivot, thereby permitting angular motion between the carriage assembly and the rocker arm assembly; a stop disposed on said rocker arm assembly and intermediate the course of travel of the carriage assembly to limit said angular motion; and extendable and retractable hydraulic actuating mechanism interconnected between said carriage assembly and said truck and operative, first, to bring the carriage assembly into contact with the stop, and, second, to revolve the carriage assembly with its contacting rocker arm assembly about the rocker arm axis as a center during a single stroke of said hydraulic mechanism.

3. The combination recited in claim 2, wherein the carriage assembly is movable into a position effective to contact a load; means for securing the upper portion of said load to said carriage; wing structure having a retracted position on the carriage and adapted to be moved to an engaging position with the load; and means effective to automatically move said wing structure from the retracted to the engaging position when the carriage moves backwardly from said vertical position.

4. In a utility truck, loading and carrying mechanism comprising a primary assemblage adapted to receive a standing load and to carry said load in ascending and descending cycles; a secondary assemblage hinged to the primary assemblage so as to provide a rocking support for the primary assemblage; a wing structure, having feet, and arranged to swing on the primary assemblage; said wing structure having a retracted position and a load engaging position; an automatic actuating mechanism operative to swing the wing structure from the retracted position into the engaging position for the ascending cycle, and from the engaging position into the retracted position at approximately the end of the descending cycle; and means for imparting motion to the primary assemblage.

5. The combination recited in claim 4, wherein the automatic actuating mechanism includes a pivoted arm on the primary assemblage; a yielding connection between the pivoted arm and the wing structure; a fixed contact on the secondary assemblage adapted to be engaged by the said pivoted arm as the primary assemblage is tilted; and spring means tensioned between the wing structure and a point on the secondary assemblage.

6. The combination recited in claim 4, wherein is included a pivoted, depressible bail having depending fingers spaced to engage a load at unobstructed points along the load; means for lowering the bail onto the load; and a wedge heel, whereby the bail, after lowering, becomes effective to draw the load against the primary assemblage.

7. In a utility truck, having a wheeled frame, the combination of a load carriage; linkage pivotally connecting said carriage to said frame, said linkage having at least four unsymmetrically disposed pivotal points, two of which pivotal points are fixed in mutually spaced relationship on the frame, and two of which pivotal points are fixed in mutually spaced relationship on the carriage for floating movement therewith; a stop operatively positioned intermediate the course of travel of said carriage for limiting movement of said carriage relative to one of the said pivotal points fixed on the carriage; and power means for moving the carriage relative to the frame.

8. In combination with a load-carrying vehicle, a load carriage tiltable within a vertical plane; linkage pivotally connecting said carriage to said vehicle; load-supporting means disposed laterally of said carriage adjacent the lower end thereof, and pivoted for inwardly and outwardly swinging movement; arm means carried by said load-supporting means; stop means associated with said linkage and engageable by said arm means during tilting movement of said carriage, for actuating said load-supporting means to swing in under a tilted load associated with said carriage; and resilient means operatively associated with said load-supporting means, said resilient means being effective to return the load-supporting means to load-disengaged position upon disengagement of said stop means by said arm means.

9. In combination with a load-carrying vehicle, a load carriage tiltable from a vertical load-receiving plane; linkage pivotally connecting said carriage to said vehicle; load-supporting means disposed laterally of said carriage adjacent the lower end thereof, and pivoted for inwardly and outwardly swinging movement; arm means carried by said load-supporting means; stop means associated with said linkage and engageable by said arm means during tilting movement of said carriage, for actuating said load-supporting means to swing in under a tilted load associated with said carriage; and means operatively associated with said load-supporting means for returning the latter to load-disengaged position upon disengagement of said stop means by said arm means.

10. In an industrial truck having a normally upstanding load-supporting carriage, means associated with said carriage for engaging a standing load; means for initially tipping said carriage and said load so that the latter rests on only a portion of the lower periphery thereof; load supports movably associated with the lower part of said carriage for entry below the raised bottom of said load; means for automatically operating said load supports during the said tipping of the carriage; and means for raising said carriage from its said tipped position, for transportation of the engaged and supported load.

11. In a handling device for standing loads, a normally upstanding carriage having a load-receiving cradle; mounting structure to which the carriage is articulatively secured; means associated with the upper part of the carriage for engaging a standing load to normally retain said load within the cradle of the carriage; means carried by said mounting structure for simultaneously tipping the carriage and a received load relative to said mounting structure, so that the load rests on only a portion of its lower periphery; load supports disposed adjacent the lower part of the carriage for entry below the raised bottom of the load; means for normally maintaining said load supports retracted from load-supporting position; and mechanism lying wholly outside the said load-receiving cradle of the carriage and intermediate the tipping travel of the carriage for actuating said load supports during the said tipping travel of the carriage and its received load.

12. In a handling device for standing loads, a normally upstanding load-receiving carriage; mounting structure to which the carriage is articulatively secured; means associated with the carriage for engaging the upper part of a standing load to normally retain said load on the carriage; means for initially tipping the carriage and the load relative to said mounting structure, so that the load rests on only a portion of its lower periphery; load supports articulatively secured to the lower part of the carriage for entry below the raised bottom of the load; resilient means biased between said mounting structure and said load supports for normally maintaining the latter retracted from load-supporting position; lever means connected with said load supports and carried by the carriage for actuating the former; abutment members carried by said mounting structure so as to lie within the path of movement followed by said lever means during the said tipping of the carriage and the load, whereby the said load supports are moved against the force of said resilient means to a position below the load upon engagement of the abutment members by said lever means; and means for raising and lowering said carriage and its supported load subsequent to said tipping thereof.

13. In apparatus for handling standing loads, which apparatus includes a carriage having a load-receiving cradle, mounting structure to which the carriage is articulatively secured, mechanism for tipping the load so it rests on only a portion of its lower periphery, and load supports disposed adjacent the lower part of the carriage for entry below the raised bottom of the load, the combination of means normally maintaining the carriage in upstanding position for engaging the load; a fastening device associated with the upper part of the carriage for securing the standing load to the carriage in its said upstanding position; means attaching said tipping mechanism to the carriage, so that the carriage and its received load are tipped simultaneously; means normally maintaining the load supports retracted from load-supporting position; levers lying wholly outside the said load-receiving cradle of the carriage and connected to said load supports, for moving the latter to load-supporting position beneath the load; and abutment members disposed intermediate the carriage and said mounting structure for actuating said levers during the course of the tipping travel of the carriage relative to the mounting structure, said abutment members lying wholly outside the said load-receiving cradle of the carriage.

14. In a device for handling upright substantially cylindrical containers, the combination of a frame adapted to be carried upon a lift truck; means on the frame adapted to tilt a first container, said means including a reach element extending over a portion of the upper end of the container; a pair of fingers symmetrically mounted on the reach element adapted to engage the cylindrical surface of the container at circumferentially spaced locations, each of the fingers being positioned in a clearance zone bounded on two sides by arcs of the curved surfaces of said first container and a like container positioned in an adjacent row in nested relation and on the third side by a plane surface tangent to the first container, said plane surface being parallel to the plane defined by the tilting movement of the longitudinal axis of the first container.

15. In a handling device for drums, barrels, or the like, adapted to rest upright on a level surface, the combination of a frame; an upright tiltable member mounted on the frame for pivotal movement about a horizontal axis; drum contacting means mounted on said member; releasable means movably mounted on the upright member adapted to maintain the drum in contact with said contacting means; power means carried on the frame adapted to tilt the said member and thereby tilt the drum rearwardly about a point on the circumference of its lower end adjacent said member; supporting shoes movably mounted on the frame; and means adapted to project said supporting shoes into clearance space between the level surface and the lower lateral portions of the lower end of the drum when in tilted position.

References Cited in the file of this patent

UNITED STATES PATENTS

| | | |
|---|---|---|
| 1,086,026 | Chweiback | Feb. 3, 1914 |
| 1,193,729 | Stebler | Aug. 8, 1916 |
| 1,371,392 | Penfield | Mar. 15, 1921 |
| 1,425,999 | Morrow | Aug. 15, 1922 |
| 1,431,861 | Adams | Oct. 10, 1922 |
| 1,446,968 | French | Feb. 27, 1923 |
| 1,479,981 | Cochran | Jan. 8, 1924 |
| 1,605,558 | Piche | Nov. 2, 1926 |
| 1,827,209 | Robbins | Oct. 13, 1931 |
| 2,030,925 | Lea | Feb. 18, 1936 |
| 2,067,546 | Rocher | Jan. 12, 1937 |
| 2,118,711 | McKinney | May 24, 1938 |
| 2,123,669 | Von Der Ohe | July 12, 1938 |
| 2,131,426 | Groff | Sept. 27, 1938 |
| 2,197,587 | Miller | Apr. 16, 1940 |
| 2,220,450 | Howell | Nov. 5, 1940 |
| 2,264,527 | Hawkins | Dec. 2, 1941 |
| 2,349,352 | Johnson | May 23, 1944 |
| 2,488,699 | Anthony | Nov. 22, 1949 |
| 2,503,522 | Struthers et al. | Apr. 11, 1950 |
| 2,539,233 | Dickson | Jan. 23, 1951 |
| 2,545,021 | Coupland et al. | Mar. 13, 1951 |